(12) United States Patent
Cernohous

(10) Patent No.: US 8,106,105 B2
(45) Date of Patent: Jan. 31, 2012

(54) COMPOSITIONS AND METHODS FOR PRODUCING HIGH STRENGTH COMPOSITES

(75) Inventor: Jeffrey Jacob Cernohous, Hudson, WI (US)

(73) Assignee: Interfacial Solutions IP, LLC, River Falls, WI (US)

( * ) Notice: Subject to any disclaimer, the term of this patent is extended or adjusted under 35 U.S.C. 154(b) by 364 days.

(21) Appl. No.: 12/523,819

(22) PCT Filed: Jan. 29, 2008

(86) PCT No.: PCT/US2008/001129
§ 371 (c)(1),
(2), (4) Date: Jul. 20, 2009

(87) PCT Pub. No.: WO2008/094529
PCT Pub. Date: Aug. 7, 2008

(65) Prior Publication Data
US 2010/0016459 A1    Jan. 21, 2010

Related U.S. Application Data

(60) Provisional application No. 60/898,063, filed on Jan. 29, 2007.

(51) Int. Cl.
*C08K 3/00* (2006.01)
*C08J 9/00* (2006.01)

(52) U.S. Cl. .................. 521/83; 521/91; 521/92; 524/2; 524/8; 524/442; 524/443; 524/444; 524/450

(58) Field of Classification Search ............. 521/83, 521/91, 92; 524/2, 8, 442, 443, 444, 450
See application file for complete search history.

(56) References Cited

U.S. PATENT DOCUMENTS

| | | | | |
|---|---|---|---|---|
| 3,668,179 A | * | 6/1972 | Di Biasi et al. | 524/166 |
| 4,248,931 A | * | 2/1981 | Salman | 428/317.9 |
| 4,616,042 A | * | 10/1986 | Avakian | 521/81 |
| 4,767,580 A | | 8/1988 | Shingo et al. | |
| 4,793,956 A | * | 12/1988 | Nogiwa et al. | 264/41 |
| 4,878,970 A | * | 11/1989 | Schubert et al. | 156/69 |
| 5,219,163 A | * | 6/1993 | Watson | 463/47.2 |
| 6,017,991 A | | 1/2000 | Drummond et al. | |
| 6,153,674 A | | 11/2000 | Landin | |
| 6,231,650 B1 | | 5/2001 | Mallow et al. | |
| 6,572,697 B2 | | 6/2003 | Gleeson et al. | |
| 6,620,487 B1 | | 9/2003 | Tonyan et al. | |
| 6,872,246 B2 | | 3/2005 | Merkley et al. | |
| 6,907,708 B2 | | 6/2005 | Naji et al. | |
| 7,241,818 B2 | | 7/2007 | Hemmings et al. | |
| 7,455,798 B2 | | 11/2008 | Datta et al. | |
| 2005/0124763 A1 | | 6/2005 | Mikami et al. | |
| 2006/0142455 A1 | | 6/2006 | Agarwal et al. | |
| 2007/0072961 A1 | | 3/2007 | Ma et al. | |

FOREIGN PATENT DOCUMENTS

| | | | | |
|---|---|---|---|---|
| JP | 51098798 A | * | 8/1976 | |
| JP | 77022383 | * | 6/1977 | |
| JP | 04236246 A | * | 8/1992 | |
| SU | 1775425 | * | 11/1992 | |
| WO | WO 2007/102825 A1 | | 9/2007 | |
| WO | WO 2008/094529 A1 | | 8/2008 | |

\* cited by examiner

*Primary Examiner* — Irina S Zemel
(74) *Attorney, Agent, or Firm* — Brian E. Szymanski

(57) ABSTRACT

The present invention relates to compositions and methods for producing high strength composites. In one embodiment, a polymer matrix and a naturally-occurring inorganic material are melt processed to produce a high strength composite. In a preferred embodiment, the naturally-occurring inorganic material is volcanic ash. High strength composites of this invention have particular utility as building materials and automotive components.

13 Claims, No Drawings

COMPOSITIONS AND METHODS FOR PRODUCING HIGH STRENGTH COMPOSITES

CROSS REFERENCE TO RELATED APPLICATIONS

This application is a national stage filing under 35 U.S.C. 371 of PCT/US2007/001129, filed Jan. 29, 2008, which claims priority to U.S. Provisional Patent Application No. 60/898,063 filed Jan. 29, 2007, the disclosures of which are herein incorporated by reference in their entirety.

FIELD OF THE INVENTION

The present invention relates to compositions and methods for producing high strength composites. Specifically, the present invention provides strategies for producing composites that possess superior mechanical properties by admixing thermoplastics with naturally occurring inorganic materials.

BACKGROUND OF THE INVENTION

There are literally billions of pounds of volcanic ash deposits around the world today. Such materials have found applications as abrasives and as filtration aids because of their unique material properties. Specifically, volcanic ash has relatively high surface area, aspect ratio and hardness.

SUMMARY OF THE INVENTION

The present invention relates to compositions and methods for producing high strength composites. Specifically, the present invention provides strategies for producing composites that possess superior mechanical properties by admixing thermoplastics with naturally occurring inorganic materials. In a preferred embodiment, a thermoplastic material is melt processed with volcanic ash to produce a composite having superior mechanical properties. Surprisingly, thermoplastic composites produced using a mixture of thermoplastics and volcanic ash have markedly improved physical properties (e.g., flexural modulus) when compared to thermoplastic materials filled with other mineral fillers. Composites of this invention have utility in many applications. Non-limiting examples include building materials and automotive components. Specific applications of particular utility include extruded sheet products, including those useful as concrete forms.

In one embodiment, a thermoplastic matrix is melt processed with a naturally-occurring inorganic material to form a useful article. In another embodiment, the thermoplastic matrix is melt processed with a naturally-occurring inorganic material and at least one additional filler to produce a composite. In this invention, composites are produced using melt processing techniques.

Materials and methods for producing melt processable polymeric materials are known. Wood composite materials have found broad application as building materials. However, wood composites known in the art have inferior mechanical properties when compared to natural wood. There is a clear need for a material that has improved strength, microbial resistance and impact resistance in the world today. This invention provides a cost-effective, simple strategy for producing low cost composite materials that have mechanical properties when compared to conventional thermoplastics or thermoplastic composites made using common inorganic fillers (e.g., talc, mica and calcium carbonate).

For purposes of the present invention, the following terms used in this application are defined as follows:

"Polymeric Matrix" means a melt processable polymeric material or resin.

"Melt Processable Composition" means a formulation that is melt processed, typically at elevated temperatures, by means of a conventional polymer processing technique such as extrusion or injection molding as an example.

"Composite" means a mixture of a polymeric material and a filler.

"Filler" means an organic or inorganic material that does not possess viscoelastic characteristics under the conditions utilized to melt process the filled polymeric matrix.

"Cellulosic Filler" means natural or man-made materials derived from cellulose. Cellulosic materials include for example: wood flour, wood fibers, sawdust, wood shavings, newsprint, paper, flax, hemp, grain hulls, kenaf, jute, sisal, nut shells or combinations thereof.

"Naturally Occurring Inorganic Material" means an inorganic material that is found in nature (e.g., volcanic ash).

The above summary of the present invention is not intended to describe each disclosed embodiment or every implementation of the preset invention. The detailed description that follows more particularly exemplifies illustrative embodiments.

DETAILED DESCRIPTION OF THE INVENTION

The present invention relates to compositions and methods for producing high strength composites. Specifically, the present invention provides strategies for producing composites that possess superior mechanical properties by admixing thermoplastics with naturally occurring inorganic materials. In a preferred embodiment, a thermoplastic material is melt processed with a volcanic ash to produce a composite having superior mechanical properties. Surprisingly, thermoplastic composites produced using a mixture of thermoplastics and volcanic ash have markedly improved flexural properties when compared to thermoplastic materials filled with conventional inorganic fillers. Specifically, composites having a flexural modulus of greater than 2000 MPa are described. Composites of this invention also have markedly improved thermal properties. For example, the coefficients of thermal expansion observed for composites of the present invention are markedly less than thermoplastics filled with conventional inorganic fillers. Specifically, composites having a coefficient of thermal expansion of less that 70 µm/m are described. In a preferred embodiment, the composites of this invention are admixed with a blowing agent during melt processing to produce a foamed composite. In a preferred embodiment, the foamed composite has a specific gravity of less than 0.90 g/cm$^3$, more preferably less than 0.80 g/cm$^3$ and most preferably less than 0.70 g/cm$^3$. Composites of this invention have utility in many applications. Non-limiting examples include building materials, transportation materials and automotive components. Preferred examples included concrete forms, railroad ties and automotive sheet stock.

The composite of this invention is comprised of a thermoplastic and a naturally occurring inorganic material. In a preferred embodiment, the inorganic material is volcanic ash. Preferred thermoplastics in this invention are polyolefins.

Any naturally occurring inorganic material is suitable in the present invention. Preferred embodiments are those that incorporate expanded volcanic ash, unexpanded volcanic ash, mica, fly ash, andesiteic rock, feldspars, aluminosilicate clays, obsidian, diatomaceous earth, silica, silica fume, bauxite, geopolymers pumice, perlite, pumicsite and combinations thereof. A most preferred inorganic material is volcanic ash. In a preferred embodiment, the naturally occurring inorganic material of this invention is chosen such that it has an aspect ratio of at least 1.5:1 (length:width). More preferably, the aspect ratio is at least 3:1 and most preferably, it is at least 5:1. Preferred embodiments of this invention utilize volcanic ash as the inorganic material. In a preferred embodiment, the inorganic material comprises 5-60 wt % of the composition, more preferably 20-60 wt % and most preferably 30-60 wt %. In an alternative embodiment, it is feasible to combine a mixture of unexpanded volcanic ash and hollow. Non-limiting examples of hollow microspheres include expanded volcanic ash and expanded perlite.

The present invention may also utilize cellulosic fillers in the composite formulation (e.g., wood flour, wood fibers, sawdust, wood shavings, newsprint, paper, flax, hemp, rice hulls, kenaf, jute, sisal, peanut shells). In a preferred embodiment, the cellulosic filler comprises 5-60 wt % of the composition, more preferably 5-40 wt % and most preferably 5-20 wt %.

The polymeric matrix functions as the host polymer and is a primary component of the melt processable composition. A wide variety of polymers conventionally recognized in the art as suitable for melt processing are useful as the polymeric matrix. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates.

Preferred polymers for blending include, high density polyethylene (HDPE), low density polyethylene (LDPE), linear low density polyethylene (LLDPE), polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters or combinations thereof. Most preferred polymeric matrices are polyolefins and thermoplastic elastomers.

In another aspect of the invention, the modified polymer matrix can be melt processed with additional fillers. Non-limiting examples of fillers include mineral and organic fillers (e.g., talc, mica, clay, silica, alumina, carbon fiber, carbon black glass fiber) and conventional cellulosic materials (e.g., wood flour, wood fibers, sawdust, wood shavings, newsprint, paper, flax, hemp, wheat straw, rice hulls, kenaf, jute, sisal, peanut shells, soy hulls, or any cellulose containing material). The amount of filler in the melt processable composition may vary depending upon the polymeric matrix and the desired physical properties of the finished composition. Those skilled in the art of melt processing polymer's are capable of selecting appropriate amounts and types of fillers to match with a specific polymeric matrix in order to achieve desired physical properties of the finished material.

The amount of the filler in the melt processable composition may vary depending upon the polymeric matrix and the desired physical properties of the finished composition. Those skilled in the art of melt processing polymers are capable of selecting an appropriate amount and type of filler (s) to match with a specific polymeric matrix in order to achieve desired physical properties of the finished material. Typically, the filler may be incorporated into the melt processable composition in amounts up to about 90% by weight. Preferably, the filler is added to the melt processable composite composition at levels between 5 and 90%, more preferably between 15 and 80% and most preferably between 25 and 70% by weight of the formulation. Additionally, the filler may be provided in various forms depending on the specific polymeric matrices and end use applications. Non-limiting examples of filler form include, powder and pellets.

Cellulosic materials are commonly utilized in melt processable compositions as fillers to impart specific physical characteristics or to reduce the cost of the finished composition. Cellulosic materials generally include natural or wood based materials having various aspect ratios, chemical composition, densities, and physical characteristics. Non-limiting examples of cellulosic materials include wood flour, wood fibers, sawdust, wood shavings, newsprint, paper, flax, hemp, rice hulls, kenaf, jute, sisal, peanut shells. Combination of cellulosic materials and a modified polymer matrix may also be used in the melt processable composition.

In another aspect of this invention, the melt processable composition includes a hollow microspheric material. Non-limiting examples of hollow microspheres include expanded volcanic ash, expanded perlite, synthetic glass microspheres, cenospheres, phenolic microspheres and polymeric microspheres. In a preferred embodiment, expanded volcanic ash is utilized in the melt processable composition. In a preferred embodiment, the specific gravity of the hollow microsphere component is less than 0.80 g/cm$^3$, and more preferably less than 0.60 g/cm$^3$ and most preferably less than 0.40 g/cm$^3$. In a preferred embodiment, between 0.5 and 20 wt % of hollow microspheres are incorporated into the melt processable composition, more preferably between 1 and 20 wt % and most preferably between 5 and 20 wt %.

In another aspect of this invention, the melt processable composition may include coupling agents to improve the compatibility and interfacial adhesion between the thermoplastic matrix and the naturally-occurring inorganic material and any other fillers. Non-limiting examples of coupling agents include functionalized polymers, organosilanes, organotitanates and organozirconates. Preferred functionalized polymers included functionalized polyolefins, included maleated polyolefins, polyethylene-co-vinyl acetate, polyethylene-co-acrylic acid, polyethylene-co-acrylic acid salts.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

In another aspect of this invention, the melt processable composition is foamed to reduce the specific gravity of the resulting composite article. Any blowing agent known in the art can be utilized to foam the composite composition of this invention. Non-limiting examples of blowing agents useful for this purpose include common endothermic and exothermic blowing agents including sodium carbonate, sodium bicarbonate, water, hydrocarbons, carbon dioxide, azo compounds, azodicarbonimide and expandable polymeric microspheres.

The melt processable composition of the invention can be prepared by any of a variety of ways. For example, the modified polymeric matrix and the filler can be combined together by any of the blending means usually employed in the plastics industry, such as with a compounding mill, a Banbury mixer, or a mixing. The filler and the modified polymeric matrix may be used in the form, for example, of a powder, a pellet, or a granular product. The mixing operation is most conveniently carried out at a temperature above the melting point or softening point of the processing additive, though it is also feasible to dry-blend the components in the solid state as particulates and then cause uniform distribution of the components by feeding the dry blend to a twin-screw melt extruder. The resulting melt-blended mixture can be either extruded directly into the form of the final product shape or pelletized or otherwise comminuted into a desired particulate size or size distribution and fed to an extruder, which typically will be a single-screw extruder, that melt-processes the blended mixture to form the final product shape.

Melt-processing typically is performed at a temperature from 120° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The composites of this invention are suitable for manufacturing articles in the construction and automotive industries. For example, in the construction industry articles incorporating the composition of the present invention may include: decking, sheeting, structural element, roofing tiles, and siding. The improved mechanical properties of the present invention enable thin and or hollow profiles, thereby reducing cost and weight for particular end use application. Those of ordinary skill in the art of designing construction articles are capable of selecting specific profiles for desired end use applications. Applications in the automotive industry include: body and interior panels and decorative articles. This invention has particular utility for producing sheet articles that are utilized as concrete forms.

The resulting articles produced by melt processing the inventive composition exhibit superior mechanical characteristics in the field of composite structures. For example, a composite utilizing volcanic ash and a polyolefin matrix exhibits substantial increases in flexural modulus and while greatly reducing the coefficient of thermal expansion. Composites of this invention also have improved hardness when compared to conventionally filled polyolefin systems. This makes them more resistant to scratch and marring in specific end use applications.

Materials

| MATERIAL | DESCRIPTION |
| --- | --- |
| HDPE | P4G4Z-011 0.8 MFI high density polyethylene commercially supplied by Huntsman (Salt Lake City, UT) |
| PP | HB1602 12 MFI polypropylene commercially supplied by BP (Warrenville, IL) |
| Wood Fiber | Wood Fiber, 40 mesh hardwood fiber commercially available from American Wood Fibers (Schofield, WI) |

-continued

| MATERIAL | DESCRIPTION |
| --- | --- |
| Volcanic Ash | Dry volcanic ore, commercially available from Kansas Minerals, Inc. (Mankato, KS) |
| Talc | Flextalc 610, commercially available from Minerals Technologies Inc. (New York, NY) |
| Blowing Agent | ALTERFORM CFA 1050, commercially available from Phillips Plastics Inc (Phillips, WI) |

Preparation of Comparative Examples CE1-CE2 and Examples 1-12.

Composite samples were prepared and tested using the following protocol. HDPE or PP was first coated with mineral oil (0.25 wt % mineral oil/99.75 wt % resin) and subsequently dry blended with filler (i.e., volcanic ash, talc, wood flour) in a polyethylene bag. The resulting blend was volumetrically fed into the feed zone of a 27 mm co-rotating twin screw extruder fitted with three strand die (commercial available from American Leistritz Extruder Corporation, Sommerville, N.J.). All samples were processed at 150 rpm screw speed using the following temperature profile: Zone 1-2=170° C., Zone 3-4=180° C., Zone 5-6=190° C., Zone 7-8=190° C. The resulting strands were subsequently cooled in a water bath and pelletized into ~¼" pellets to produce the composite formulation. The resulting pellets were injection molded into test specimens following ASTM D638 (tensile) and D790 (flexural) specifications. Injection molding on composite formulations was performed using a 85 ton machine (commercially available from Engel Corporation, York, Pa.) having a barrel and nozzle temperature of 390° F. to produce specimens for tensile, flexural and moisture testing. The flexural and tensile properties were subsequently tested as specified in the ASTM methods. Table 1 gives the formulations that were produced following this procedure. Table 2 gives the mechanical properties of these composite formulations.

TABLE 1

Formulations for Comparative Examples CE1-CE2 and Examples 1-12

| Example | HDPE (wt %) | PP (wt %) | Volcanic Ash (wt %) | Talc (wt %) | Wood Fiber (wt %) |
| --- | --- | --- | --- | --- | --- |
| CE1 | 60 | — | — | 40 | — |
| CE2 | — | 60 | — | 40 | — |
| 1 | 60 | — | 40 | — | — |
| 2 | 50 | — | 50 | — | — |
| 3 | 40 | — | 60 | — | — |
| 4 | — | 60 | 40 | — | — |
| 5 | — | 50 | 50 | — | — |
| 6 | — | 40 | 60 | — | — |
| 7 | 50 | — | 25 | — | 25 |
| 8 | 50 | — | 30 | — | 20 |
| 9 | 50 | — | 40 | — | 10 |
| 10 | — | 50 | 25 | — | 25 |
| 11 | — | 50 | 30 | — | 20 |
| 12 | — | 50 | 40 | — | 10 |

Preparation of Examples 13-18.

Foamed composite samples were prepared and tested using the following protocol. HDPE or PP was first coated with mineral oil (0.25 wt % mineral oil/99.75 wt % resin) and subsequently dry blended the foaming additive and filler (i.e., volcanic ash, talc, wood flour) in a polyethylene bag. The resulting blend was volumetrically fed into the feed zone of a 27 mm conical twin screw extruder fitted with 1.26 cm×0.32 cm rectangular profile die (commercial available from American Leistritz Extruder Corporation, Sommerville, N.J.). All samples were processed at 150 rpm screw speed using the following temperature profile: Zone 1-2=170° C., Zone 3-4=180° C., Zone 5-6=190° C., Zone 7-8=190° C. The resulting profiles were quenched in cold water just after exiting the die. The resulting profiles were cut into test specimens and tested following ASTM D638 (tensile) and D790 (flexural) specifications. Density was determined by first determining the mass of the sample in air and the mass of the sample when submerged in water. Density was subsequently determined using Archimedes Principle. Table 3 gives the formulations that were produced following this procedure. Table 4 gives the mechanical properties and densities of these composite formulations.

TABLE 2

Tensile and Flexural Properties for Comparative Examples CE1-CE2 and Examples 1-12

| Example | Tensile Strength (MPa) | Elongation At Break (%) | Flexural Modulus (MPa) | Coefficient of Thermal Expansion (μm/M) |
|---|---|---|---|---|
| CE1 | 21.1 | 20.0 | 2150 | 53 |
| CE2 | 17.2 | 10.5 | 1590 | 78 |
| 1 | 28.6 | 6.1 | 2860 | 35 |
| 2 | 26.5 | 2.3 | 3320 | 32 |
| 3 | 25.4 | 1.8 | 5250 | 30 |
| 4 | 41.6 | 5.5 | 4230 | 35 |
| 5 | 39.2 | 2.0 | 5210 | 28 |
| 6 | 37.3 | 1.2 | 6340 | 20 |
| 7 | 14.8 | 2.2 | 3430 | 32 |
| 8 | 14.4 | 2.0 | 2960 | 30 |
| 9 | 13.7 | 2.0 | 3380 | 32 |
| 10 | 23.1 | 2.0 | 5420 | 28 |
| 11 | 22.1 | 2.0 | 5310 | 27 |
| 12 | 21.2 | 2.0 | 5410 | 30 |

TABLE 3

Formulations for Examples 13-18

| Example | HDPE (wt %) | PP (wt %) | Volcanic Ash (wt %) | Foaming Additive (wt %) |
|---|---|---|---|---|
| 13 | 58 | — | 40 | 2 |
| 14 | 48 | — | 50 | 2 |
| 15 | 38 | — | 60 | 2 |
| 16 | — | 58 | 40 | 2 |
| 17 | — | 48 | 50 | 2 |
| 18 | — | 38 | 60 | 2 |

TABLE 4

Tensile and Flexural Properties for Examples 13-18

| Example | Flexural Modulus (MPa) | Density (g/cm³) |
|---|---|---|
| 13 | 2130 | 0.69 |
| 14 | 2640 | 0.81 |
| 15 | 3220 | 0.90 |
| 16 | 3350 | 0.65 |
| 17 | 3860 | 0.74 |
| 18 | 4120 | 0.78 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A composition comprising:
    (a) a thermoplastic matrix,
    (b) volcanic ash, and
    (c) a coupling agent, wherein the composition upon melt processing exhibits a flexural modulus of greater than 2000 MPa, a coefficient of thermal expansion of less than 70 μm/m and a density from 0.65 to 0.90 g/cm³.

2. The composition of claim 1 wherein the volcanic ash is expanded volcanic ash or unexpanded volcanic ash.

3. The composition of claim 1, wherein the thermoplastic matrix is high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, liquid crystal polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters or combinations thereof.

4. The composition of claim 1 further comprising a blowing agent.

5. The composition of claim 1 wherein the volcanic ash has an average Length:Diameter aspect ration of at least 4:1.

6. The composition of claim 1 further comprising a cellulosic filler.

7. The composition of claim 1, further comprising one or more of antioxidants, light stabilizer, fibers, blowing agents, foaming agents, antiblocking agents, heat stabilizers, impact modifiers, biocides, compatibilizers, flame retardants, plasticizers, tackifiers, colorants, processing aids, lubricants, coupling agents, and pigments.

8. The composition of claim 1, further comprising an impact modifier.

9. A method of forming a composite, comprising melt processing a thermoplastic matrix, volcanic ash, and a coupling agent, wherein the melt processed composition exhibits a flexural modulus of greater than 2000 MPa, a coefficient of thermal expansion of less than 70 m/m and a density from 0.65 to 0.90 g/cm³.

10. The method of claim 9, wherein the melt processing includes extrusion, injection molding, batch mixing, blow molding or rotomolding.

11. The method of claim 9, further comprising a blowing agent.

12. An article comprising a thermoplastic matrix, volcanic ash, and a coupling agent and wherein the article exhibits a flexural modulus of greater than 2000 MPa, a coefficient of thermal expansion of less than 70 μm/m and a density from 0.65 to 0.90 g/cm³.

13. The article of claim 12, wherein the article is a sheet, concrete form, railroad tie, building material or an automotive component.

* * * * *